Aug. 25, 1959  J. B. MRAZ  2,901,029
RIM CLAMPING, TIRE-BEAD-BREAKING TOOL
Filed Jan. 14, 1957  2 Sheets-Sheet 1
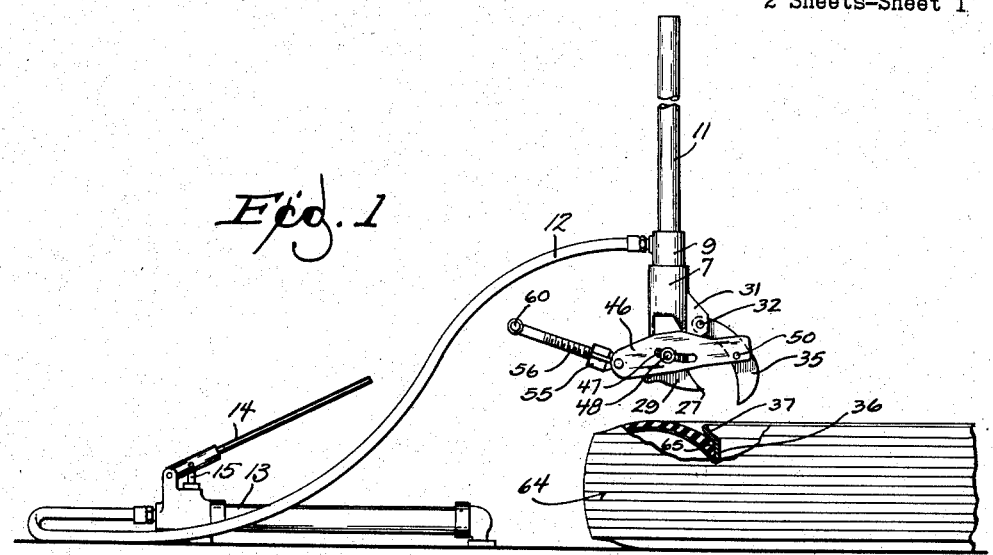
INVENTOR.
JOHN B. MRAZ
BY
Wheeler, Wheeler & Wheeler
ATTORNEYS Aug. 25, 1959 J. B. MRAZ 2,901,029
RIM CLAMPING, TIRE-BEAD-BREAKING TOOL
Filed Jan. 14, 1957 2 Sheets-Sheet 2
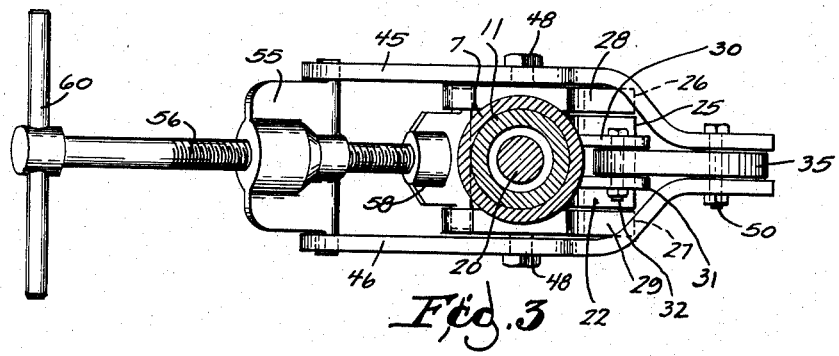
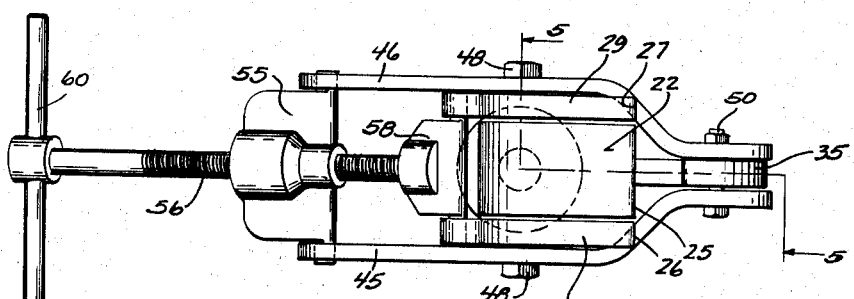
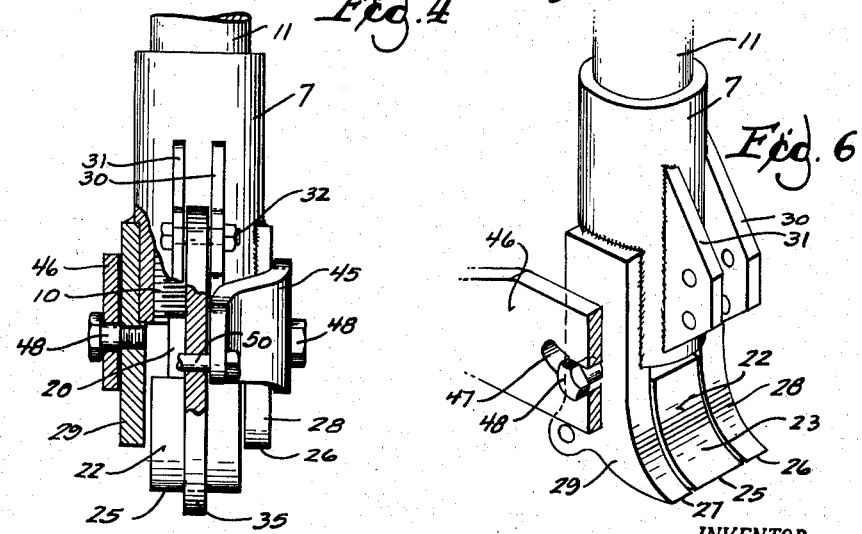
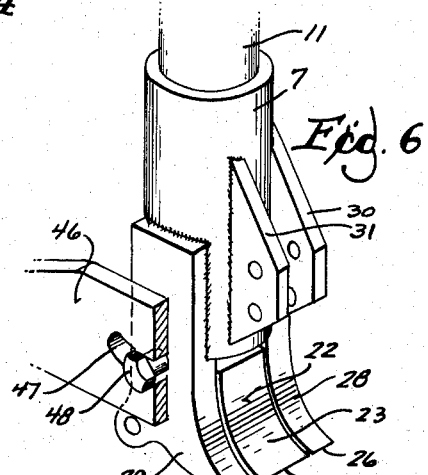
INVENTOR.
JOHN B. MRAZ
BY
Wheeler, Wheeler & Wheeler
ATTORNEYS

2,901,029
Patented Aug. 25, 1959

2,901,029
RIM CLAMPING, TIRE-BEAD-BREAKING TOOL
John B. Mraz, Fond du Lac, Wis.

Application January 14, 1957, Serial No. 634,022

2 Claims. (Cl. 157—1.17)

This invention relates to a tire demounting tool.

It is believed that the construction herein disclosed has advantages over all of the prior art devices intended for the same general function. The tool comprises a frame portion into which a hydraulic jack cylinder may be inserted with its ram projecting therethrough and provided with a bead-engaging head. It is important that the head curves downwardly and laterally to a chisel edge which, in the retracted position of the ram, substantially registers with the pointed ends of jaw teeth connected with the frame and likewise extending curvilinearly and laterally of the frame.

Cooperating with the spaced jaw teeth which are frame-mounted, there is another tooth of substantially greater length which is pivoted to the frame and extends curvilinearly in opposition to the frame-mounted teeth to engage the inner periphery of the tire rim. Links connect this pivoted tooth across the frame to a yoke with which a vise screw is in threaded connection, the inner end of the screw being socketed in a member pivoted to the frame-mounted teeth so that tightening of the screw will force the ram-mounted tooth and the frame-mounted teeth simultaneously into the crevice between the rim flange and the tire casing bead. The hydraulic jack cylinder has an upwardly extending post which serves as a handle lever for maintaining the jack cylinder and ram in proper position while the vise screw is being tightened to force the jaws into position.

When the jaw has been forced inwardly toward the bead as far as possible, hydraulic pressure is admitted to the jack cylinder and the ram is forced inwardly to break the bead from its adhesive connection with the rim. When the tire has been on the rim for a considerable period, the adhesion is great and a very considerable amount of pressure is required to break it free. The tool herein disclosed is capable of exerting any pressure required and it is particularly effective because of the form of its several teeth, the position in which the jack is held and the manner in which the teeth have been forced into operative relationship to the tire bead.

In the drawings:

Fig. 1 is a view in side elevation showing the tool about to be applied to a rim-mounted tire, portions of which are broken away in cross section.

Fig. 2 is an enlarged fragmentary detail view showing the tool frame and portions of its operating parts in section and showing in section the tire bead displaced from the rim flange.

Fig. 3 is a view taken in section on line 3—3 of Fig. 2.

Fig. 4 is an inverted plan view.

Fig. 5 is a view largely in front elevation but partially broken away to the section indicated in Fig. 4.

Fig. 6 is a fragmentary detail view of the operating part of the device with the inner jaw and portions of its operating section broken away.

The tool is assembled upon a tubular frame 7 having a shoulder at 8 against which the jack cylinder 9 is engaged, the cylinder having a reduced threaded terminal portion 10 in threaded connection with the lower end of the frame as shown in Fig. 2. Extending upwardly from the cylinder is a post 11 which constitutes a handle lever for manipulating the tool. A pressure hose 12 leads to the upper end of the cylinder from the jack pump 13 which has an operating handle 14 connected with displacement piston 15 for delivering fluid in small increments into cylinder 9.

The threaded extension 10 of cylinder 9 provides a bearing in which the ram piston 20 is guided for reciprocation under pressure of the hydraulic liquid delivered into the cylinder. The piston 20 projects from the cylinder and has a threaded terminal portion 21 to which is mounted the tire wall-engaging head 22. This head has front and rear faces 23 and 24 converging downwardly and rearwardly to a chisel tooth at 25. In the retracted position of the ram 20 and head 22, the tooth 25 registers with the corresponding teeth 26 and 27 of jaws 28 and 29 which are mounted on the frame 7 at opposite sides of the head 22 and are curved in general correspondence with head 22 toward their apices 25, 26 and 27 initially aligned as shown in Fig. 6.

At its forward side, the tubular frame 7 is provided with laterally spaced ears 30 and 31 welded thereto as best shown in Fig. 5. These support a pintle 32 upon which the jaw 35 is pivotally connected with the frame 7. This jaw is of such length as to extend materially below the level of the opposed jaws 28 and 29 as best shown in Fig. 1 and Fig. 2. Whereas the frame-mounted jaws 28 and 29 curve rearwardly toward the center of the rim, the elongated pivoted jaw 35 curves outwardly toward the tire and is positioned to engage the rim 36 well within the flange 37. Its form is such that its outer surface 38 will clear the marginal portion of the rim when its terminal tooth portion is engaged with the inner rim periphery, the object being to obtain a solid pressure engagement of this jaw with the rim at a point sufficiently close to the central plane of the rim so that the mounting will be stable.

Links 45 and 46 are disposed at opposite sides of the frame member 7 and are provided with arcuate slots 47 guided upon shoulder bolts 48 which project outwardly on opposite sides of the frame from the frame-mounted jaws 28 and 29. The links 45 and 46 have a common pintle bolt connection at 50 with jaw 35. At the outer side of the frame, the links 45 and 46 are pivoted to a yoke 55 which is provided with internal screw threads adjustably mounting it on the vise screw 56. The inner end portion 57 of the vise screw is swiveled in a socket 58 which is pivoted between the frame-mounted jaws 28 and 29 as shown in Figs. 2 and 4. The vise screw is rotated by means of the handle 60 at its end and it serves to develop a powerful clamping pressure which forces the jaws 28 and 29 inwardly along the rim flange 37, carrying with them the aligned toothed pressure head 22, until the tool is clamped securely to the rim and the pressure head engages the tire 64 in close proximity to its bead 65.

When pressure is now applied to the ram, as by manipulating handle 14 to pump fluid into the jack cylinder 9, the head 22 is forced downwardly to break the bead 65 from adhesion with flange 37 of rim 36. It is easy, through the use of this tool, to develop any amount of pressure required for this purpose and the amount of pressure needed is minimized by the reason of the fact that the head 22 at the lower end of the ram has been forced with the jaws 28 and 29 wedgingly between the casing and rim until the pressure is applied close to the bead where it will be most effective. Even the wedging action might not have maximum effectiveness but for the fact that the lever handle 11 enables the operator to hold the tool upright in the position shown in Figs. 1 and 2.

No means is shown for relieving pressure from the jack, this being conventional in apparatus of this character and usually incorporated in the pump. Upon release of pressure, the expansion of the side wall of the tire forces the ram and head 22 back to the position illustrated in Figs. 1 and 6. Thereupon the vise screw 56 is unthreaded to release the rim from clamping engagement between jaws 28, 29 and 35. Now the tool is readily lifted by means of handle 11 and reapplied to some other point about the periphery of the tire, the operation being repeated as often as necessary until all adhesions between the tire bead and rim have been broken. Great economies in time are effected through the use of this tool as compared with any other known means of dismounting a tire. In addition, this tool accomplishes the dismounting operation without damage to the tire bead such as is occasioned by other methods of tire dismounting.

I claim:

1. In a device for exerting pressure on the bead portion of a tire for dismounting it from a rim, the combination with a frame and a jack mounted thereon and having a downwardly extensible ram, of a rim-engaging jaw connected with the frame and extending downwardly and outwardly for engagement with the inner periphery of a tire rim, a pair of laterally spaced jaws complementary to the jaw first mentioned and having toothed portions extending downwardly and inwardly for engagement within the flange of said rim, means for effecting relative approaching movement between the jaw first mentioned and the laterally spaced jaws whereby the laterally spaced jaws are forced inwardly with the apices of the pair of jaws bearing along the rim flange and between the flange and the tire bead engaged therewith, and a head connected with the jack ram and normally lying between the laterally spaced jaws and extending to an apex adapted to be forced with said jaws between the rim flange and tire bead whereby, upon the extension of said ram, the said head will engage the tire in proximity to its bead in a direction to displace the bead portion of the tire from adhesion to the rim flange, the jaw first mentioned having pivotal connection with the frame and the laterally spaced jaws being rigidly connected therewith, an operating screw in swivel connection with the laterally spaced jaws and provided with a nut yoke having links connecting it with the jaw first mentioned and constituting means for effecting relative movement between the jaw first mentioned and the laterally spaced jaws, the laterally spaced jaws having laterally projecting studs and the links having guide slots engaged with the studs whereby the force exerted by the screw maintains the apices of the laterally spaced jaws in bearing relation on the rim flange.

2. In a device for clamping a tire rim and dislodging the bead of a tire casing therefrom, the combination of a frame having a normally retracted downwardly extensible ram operatively mounted therein and provided with means for effecting downward operation of said ram, of laterally spaced jaws in rigid connection with the frame, an intermediate jaw between the laterally spaced jaws and connected with the ram, the several jaws being in substantial alignment in a transverse direction before the ram is extended, the several jaws having corresponding apices directed inwardly from projection toward the outer periphery of a tire rim, a rim-engaging jaw having an apex opposed to the apices of the three jaws first mentioned, said rim-engaging jaw being adapted to engage the inner periphery of said rim and having a pivotal connection with an intermediate portion of said frame at the side thereof at which said jaw operates, a jack screw having a swiveled thrust bearing in connection with the opposite side of said frame near the lower end thereof, a nut in threaded connection with said screw, a yoke comprising links extending at opposite sides of the frame and pivotally connected with said nut and with said rim-engaging jaw for drawing the latter jaw toward the jaws first mentioned for the clamping engagement of a rim, and means for guiding said links from laterally opposed portions of the frame.

References Cited in the file of this patent

UNITED STATES PATENTS

| | | |
|---|---|---|
| 2,520,330 | Northrup et al. | Aug. 29, 1950 |
| 2,538,962 | Branick | Jan. 23, 1951 |
| 2,581,086 | Edenfield et al. | Jan. 1, 1952 |
| 2,616,487 | Parks | Nov. 4, 1952 |
| 2,682,298 | Manupello | June 29, 1954 |
| 2,753,923 | Bowyer | July 10, 1956 |
| 2,771,941 | Manupello | Nov. 27, 1956 |
| 2,822,863 | Regnault | Feb. 11, 1958 |

FOREIGN PATENTS

| | | |
|---|---|---|
| 1,058,360 | France | Mar. 16, 1954 |